May 21, 1968     R. L. SHARMA     3,384,873
SELECTIVE CALLING SYSTEM
Filed Jan. 22, 1965     6 Sheets-Sheet 1
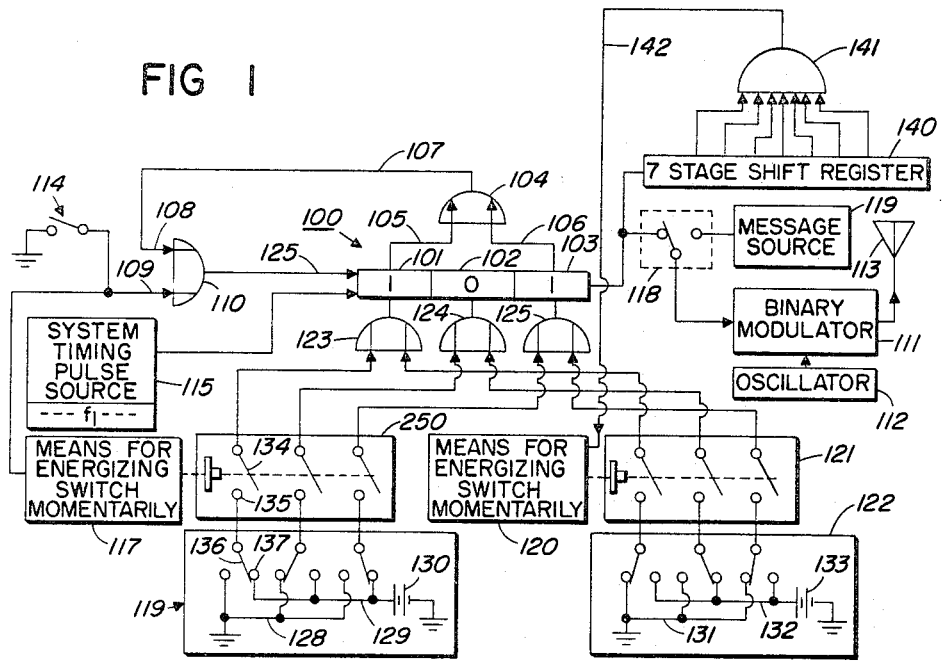
FIG 1
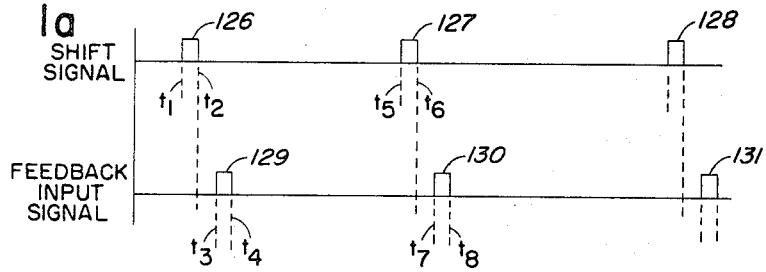
FIG 1a
FIG 2
| ROW | INITIAL SETTING | OUTPUT OF SHIFT REGISTER 100 | |
|---|---|---|---|
| 1 | 101 | 1100101 | * |
| 2 | 010 | 1110010 | * |
| 3 | 001 | 0111001 | * |
| 4 | 100 | 1011100 | * |
| 5 | 110 | 0101110 | * |
| 6 | 111 | 0010111 | * |
| 7 | 011 | 1001011 | * |
| 8 | 101 | 1100100 | * |
\* FIRST PULSE GENERATED AT OUTPUT
INVENTOR.
ROSHAN LAL SHARMA
BY *Moody and Phillips*
    ATTORNEYS INVENTOR.
ROSHAN LAL SHARMA
BY
Moody and Phillion
ATTORNEYS May 21, 1968     R. L. SHARMA     3,384,873
SELECTIVE CALLING SYSTEM
Filed Jan. 22, 1965     6 Sheets-Sheet 4

INVENTOR.
ROSHAN LAL SHARMA
BY
Moody and Phillion
ATTORNEYS

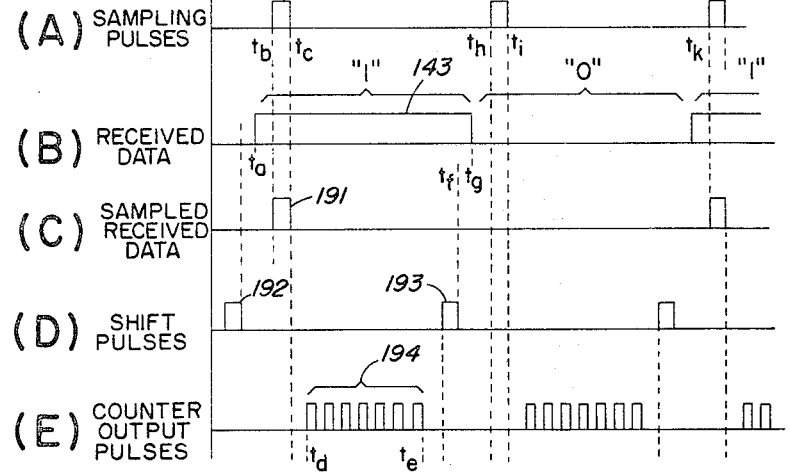
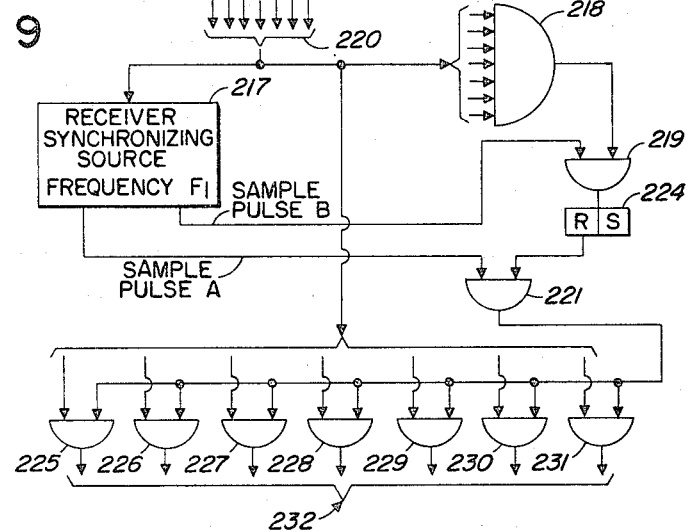
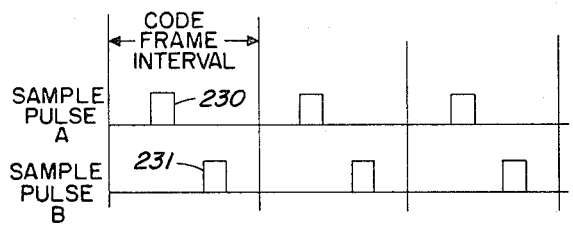

United States Patent Office 3,384,873
Patented May 21, 1968

3,384,873
SELECTIVE CALLING SYSTEM
Roshan Lal Sharma, Tustin, Calif., assignor to Collins Radio Company, Cedar Rapids, Iowa, a corporation of Iowa
Filed Jan. 22, 1965, Ser. No. 427,384
5 Claims. (Cl. 340—146.1)

ABSTRACT OF THE DISCLOSURE

A selective calling system including means for generating an address recognition code followed by an address code, with both of said codes being of the cyclical, or redundant, type. At the receiver, means are provided to receive and identify the address recognition code and then to energize an address generating circuit at the receiver which functions to generate the address unique to that receiver. The receiver also receives the transmitted address code and in response to the address recognition code functions to compare the address code generated at the receiver with the received address code to determine the degree of coincidence. If coincidence is sufficiently high the address is presumed correct.

---

This invention relates generally to selective calling systems and more particularly, to selective calling systems employing cyclical group codes rather than repetitive type addressing codes.

In cases where more than two stations or persons are involved in a communication network some form of switching and addressing is needed to obtain communication between selected stations. In other words, a given station acting as a transmitter may wish to communicate with one of two or more other stations acting, at that time, as receivers. It is necessary to have some addressing means whereby the transmitter can communicate solely with the desired receiver. Such addressing ordinarily requires some redundancy, that is, additional transmitted digital information, to enable the desired receiver to be identified as the called receiver. Redundancy may be termed as additional information required to demultiplex different stations using the same network facility. Redundancy has another use which involves protecting digital communication link against the randomly occurring errors which exists in every known communication system.

In most conventional addressing schemes the information or the messages are surrounded, or preceded by some form of repeated address, of the station to which the message is sent, and followed by a repeated stop code. For example, a receiving station may be designated by an address XYZ. The message may be preceded by three transmissions of XYZ. The receiving station can make a majority decision as to the addressed station by observing if two out of the three transmitted addresses were the same. In doing so, the receiving station can compare the received addresses in three different manners.

Firstly, the receiver can compare the respective address symbols as whole units, so that at least two of the three addresses must be the address XYZ.

Secondly, the receiver may compare the received address as address symbols. As example, assume the addresses received were distorted due to noise so that the received symbols were as follows:

XCZ
DYZ
XYZ

By comparing the specific symbols of the received address, the receiver is able to make a majority decision of XYZ since each of the symbols, X, Y, and Z occur at least twice in its proper position in the received codes.

The third method by which the receiver may identify the received address is to compare the binary digits of the received address codes. If efficiency is defined as a probability of complete recognition of the address, it can be shown that the efficiency for the third mentioned comparison technique is better than the other two and that the second is better than the first.

Thus, in the present state of the art, a binary digit comparison technique is the most efficient. It can be used more efficiently with repetitions of a selective calling code than any other known system. There are certain disadvantages, however, even with the binary digit comparison technique, as outlined briefly above. Such disadvantages are as follows:

(1) There is little or no protection against loss of code synchronization. The bits or symbols immediately surrounding the code (in a series type transmission) might be taken as a part of the code, resulting in confusion or a breakdown of the system.

(2) The selection calling identification address code may not possess an optimum group relationship. In other words, some codes may be more similar to each other than other codes. Such similarity in codes can result in inefficiency in that it takes fewer errors for any given code to become unidentifiable from a closely related code since a few errors in the closely related codes may also produce the same resultant erroneous code as a few errors in the first code.

An object of the present invention is an improved selective calling system which dispenses with repetition of an address code and instead uses highly redundant group codes as selective calling codes.

Another object of the invention is a selective calling system using a binary bit comparison technique of a highly redundant group of binary bits without repetition.

A third object of the invention is a simplified and more efficient type of calling, or addressing, coding system than heretofore known.

A fourth purpose of the invention is the improvement of selective calling systems, generally.

In accordance with the invention there is provided a means for generating the redundant group code at the transmitter and another means for receiving and identifying the received redundant group code at the receiver, of which there may be a plurality, each with its own unique addressing code. At the transmitter the redundant group code is generated by a first shift register of $n$ stages where $n$ is at least three. Although any number of stages may be employed, assume for discussion purposes herein, that $n=3$. The first and third stages can have outputs supplied to an exclusive OR circuit which constitutes a modulo 2 adder. By definition, a modulo 2 adder performs the function of producing a signal representing a binary bit "0" when pulses representing "0's" are supplied to both input terminals or pulses representing "1's" are supplied to both input terminals thereof. When a signal representing a logic "1" is supplied to only one (either) of the input terminals of the modulo 2 adder, and a logic "0" is supplied to the other input thereof, the output of the modulo 2 adder is always a logic "1." Since the output of the modulo 2 adder is supplied to the input of the shift register, the output of the shift register will follow a definite pattern of "1's" and "0's" as will be discussed later herein, with repitition occurring every $(2^n-1)$ output pulses, where $n$ is the number of stages of the shift register. Mathematically, the above-described connections can be expressed by polynomials that are primitive and irreducible.

It should be noted that there are two general methods for transmitting the redundant code. One of these methods utilizes serial transmission of the bits of the codes and the other method utilizes parallel transmission of the bits of each code. In the case where transmission is in the parallel form, the receiving means will receive all the bits of a given code simultaneously, i.e., in parallel, with the result that recognition of a given code is simplified with little or no possibility of bits from adjacent codes confusing the recognition process.

In the case, however, where transmission of the codes is in series form, the possibility of bits on either side of the address codes confusing recognition of the address code is present. To avoid such confusion, an address recognition code, also consisting of $2^n-1$ bits, is sent immediately preceding the address code. Such address recognition code preferably is one of the group of codes making up the group of redundant codes and reserved specifically for the address recognition function. All receivers are provided with means to recognize the address recognition code, and upon receipt thereof will be informed that the next $2^n-1$ bits immediately following the address recognition code constitute an address code. Such address code is examined by each receiver to determine if it is the receiver being addressed. Only that receiver having such address will respond positively thereto. Thus, the address recognition code performs the function of maintaining code synchronization.

As indicated above, at each receiver there is provided means for recognizing the address recognition code. Such means may comprise a second shift register means, all the stages of which have outputs connected to an AND gate. The number of stages of said second shift register is made equal to the bit length of the address recognition code and only when said shift register contains said address recognition code will the AND gate respond thereto to provide an output pulse informing the receiver that the next group of $(2^n-1)$ pulses will constitute an address code.

First counting means is also provided in the receiver to count the number of bits received after the address recognition code has been recognized. When $(2^n-1)$ bits have been received after the address recognition code, each receiver functions to examine said $2^n-1$ bits, now stored in the shift register, to determine if such bits constitute the address code of that receiver.

The examination of the address code is accomplished generally as follows. Each receiver is provided with a local redundant code generator similar to that provided at the transmitter. However, the local generator at each receiver is unique in that it is constructed to initiate the address code from a different setting of the stages of said local code generator, and thus to generate the address of that receiver only. At the completion of the generation of each address code the receiver generator is reset automatically in preparation for the next code generation.

Generation of the local address code is effected after the address code has been completely entered into the said second shift register and is initiated by the output of said first counter means. The information in the second shift register is then compared with the information generated by the receiver code generator to determine if coincidence exists. When coincidence exists between the received code, i.e., the code stored in the second shift register, and the code generated by the local generator, the particular receiver in which coincidence occurs senses that it is being addressed and initiates proper circuitry for the reception of the intelligence-bearing codes which normally follow the address code.

Specifically, the comparison of the received data stored in the second shift register at the receiver and the code generated by the local code generator is obtained by passing the information contained in said second shift register, and also the code generated by the local code group generator, through a coincidence circuit. The code stored in the storage shift register is immediately recirculated back into the storage shift register before the reception of the next bit.

If the degree of coincidence exceeds a predetermined threshold, gating means is opened to admit to this particular receiver the intelligence-bearing information that follows the address (redundant) code. Only one receiver will be caused to become so receptive since each receiver has an address unique thereto.

After a message has been received, some means is required to indicate the end of the message. Such function is accomplished by again transmitting an address recognition code followed by the address code of the receiver being addressed. Said receiver will respond thereto to disable itself from reception of further information until the occurrence of its next address code.

In accordance with another embodiment of the invention, means are provided to receive address codes transmitted in parallel form. In such an embodiment each 7-bit code, which might be a data code or an address code, is supplied at the receiver, in parallel, to the seven stages of said second shift register. The local redundant code generator generates its own address once after each new 7-bit code has been received; the code in the second shift register then being compared with the locally generated address code.

Comparison of the received code stored in said second shift register and the code generated by the local code generator is obtained by recirculating the information in the said second shift register after the reception of each code, and at the same time generating the local address code from the local code generator. More specifically, comparison is made between the corresponding individual bits of these two signals in coincidence circuit, and if the degree of coincidence is beyond a predetermined threshold, gating means is opened to admit to the addressed receiver the information following the address code. With the parallel form of transmission it is not necessary to employ an address recognition code.

The above and other features and objects of the invention will be more fully understood from the following detailed description thereof when read in conjunction with the drawings in which:

FIG. 1 is a block diagram showing a means for generating the redundant code group;

FIG. 1a is a set of pulse waveforms to facilitate an understanding of the operation of FIG. 1;

FIG. 2 is a chart showing the redundant code groups generated for various initial settings of the generator of FIG. 1;

Figure 5:
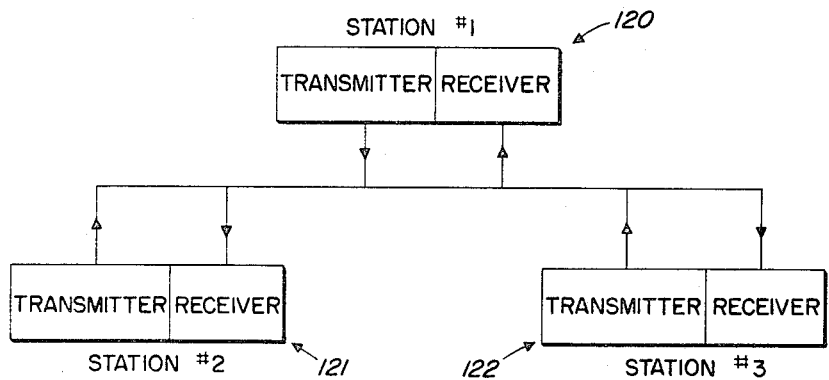
FIG. 5 is a block diagram showing the general arrangement of a plurality of stations, each station having a transmitter and receiver.

As discussed above, the present invention functions to selectively address one of a plurality of receivers so that transmission can be made to the selected receiver to the exclusion of the other receivers. In some multistation systems each station has both a transmitter and a receiver, with three or more stations being employed in the overall system. Each station is capable of transmitting to any of the receivers of the other stations to the exclusion of all remaining receivers. Such a system is shown in simplified manner in FIG. 5, wherein there are three stations: 120, 121, and 122. Each of these three stations is comprised of a transmitter and a receiver, with the transmitter of each station being connected to the receivers of all the remaining stations. In this circuit of FIG. 5, each transmitter is also shown as being connected to its own receiver. This is not an objectionable arrangement inasmuch as a transmitter ordinarily would not transmit the address code of its own receiver. Consequently, it would not be connected to its own receiver.

Each of the transmitters is equipped to generate the address codes of all receivers; said address codes being known herein as redundant group codes, or redundant codes. The redundant codes generated by the transmitters are related to each other in a manner to be described in detail later. Each code consists of a series of marks and spaces arranged in a predetermined order which repeat themselves at periodic intervals. Further, each of the receivers is constructed to respond to a unique redundant code transmitted by a transmitter, i.e., each receiver is responsive to a different pattern of marks and spaces.

Referring now to FIG. 1, there is shown the block diagram of a generator for generating a redundant group code. The circuit of FIG. 1 consists of a shift register 100 comprised of three stages: 101, 102, and 103. The bits contained in the stages 101, 102, and 103 are shifted progressively from left to right by means of shift signals generated by shift signal generator 115 (timing pulse source) at a frequency $f_1$. Such shift signals are represented by pulses 126, 127, and 128 of FIG. 1a. As each shift occurs, the bits in first and third stages 101 and 103 function to supply output pulses to input leads 105 and 106 of exclusive OR gate 104, with a polarity depending upon the nature of the bits stored in stages 101 and 103. If the bits stored in the first and third stages are the same, i.e., both logic "0's" or both logic "1's," then the output of OR gate 104 (a modulo 2 adder) is a "0." If, however, either stage 101 or stage 103 of shift register 100 contains a "1" and the other stage contains a "0," then the output of modulo 2 adder 104 will be a "1" (sometimes referred to herein as a mark). The output of modulo 2 adder 104 is then supplied through lead 107 to input 108 of OR gate 110, and thence to input lead 125 of shift register 100.

Assume that the data contained in shift register 100 is as shown in FIG. 1, i.e., consists of the binary code "101." When shift signal generator 115 generates a pulse to shift the information contained therein forward one stage, the "1's" appearing in stages 101 and 103 produce a "0" on output lead 107 of modulo 2 adder 104, which "0" will then be fed back to stage 101. There must be sufficient delay in the system so that the shift of the information contained in stages 101, 102, and 103 occurs, and is completed, before the output of modulo 2 adder 104 is fed back into stage 101. Further, when such shifting occurs, the information contained in stage 103 is shifted out of the shift register and into modulating means 111 through switch 118, where it is employed to modulate the carrier frequency generated by oscillator 112. The modulated carrier is then supplied to some suitable transmitting medium, such as antenna 113. The switch 118 is shown symbolically and is used to switch between message source 119 and the address generating means; which address generating means constitutes most of the remainder of the circuit of FIG. 1.

The time relation between the pulse fed back from the output of the modulo 2 adder 104 to the input of the shift register, and the shift pulses is shown in FIG. 1a, wherein pulses 129, 130, and 131 represent the pulses fed back from the modulo 2 adder 104. It will be apparent from FIG. 1a that pulses 129, 130, and 131 lag shift pulses 126, 127, and 128 by a short time interval. For example, the leading edge of pulse 129 lags the trailing edge of the pulse 126 by a time interval equal to $t_3 - t_2$.

As discussed above, a complete address consists of an address recognition code, which is common to all receivers, followed by an address code which is unique to a given receiver. The address recognition code, which is transmitted first, is generated from a preset condition of shift register 100 of FIG. 1. For purposes of discussion assume that this preset condition consists of the binary bits "1," "0," "1" in the three stages of shift register 100. Such an initial condition is set into shift register 100 when switch 114 is closed. The closure of switch 114 energizes circuit means within block 117 to close the three armatures (such as armature 134) of ganged momentary call switch 250 on their associated contacts (such as contact 135). Call storage switch 119 also contains three armatures connected respectively to the three contacts of momentary call switch 250. The three armatures of storage switch 119, such as armature 136, can be preset to either make with a ground terminal, or the positive terminal of battery 130. Thus, in essence, call storage switch 119 consists of three single pole, double throw switches with a choice of making contact between ground potential or the positive potential of battery 130 with the movable arm of each switch. If the movable arm is connected to ground, a logic "0" is represented thereby. If the arm is connected to the battery 130, a logic "1" is represented thereby. Then when switch 250 is closed momentarily, the logic "1's" and "0's" are passed through OR gates 123, 124, and 125 into shift register 100 to set the stages as shown in FIG. 1.

The address recognition code will thus be generated as shown in the right-hand column of the top row of FIG. 2. Specifically, this address recognition code is "1100101," which code is fed into the 7-bit shift register 140. An AND gate 141 has seven inputs thereto from the seven individual stages of shift register 140, and when the address recognition code is present in said shift register, will produce an output signal on lead 142 which will energize the control circuit means within block 120. Energization of the block 120 will function to momentarily close the three movable arms of momentary call switch 121, which will reset the three stages of shift register 100 in accordance with the code which has been preset in call storage switch 122.

It will be noted that the code present in call storage switch 122 represents the initial settings required to generate the unique address code of the receiver being addressed.

The shift register 100 then proceeds to generate the address code in accordance with its present condition which in the particular example shown in block 122 is "010."

In FIG. 2 there is shown a chart illustrating the signals generated by the shift register generator 100 of FIG. 1 for any given initial setting of the three stages of shift register 100. For example, if shift register 100 initially contains the bits "101," then the output signal supplied to the modulating means 111 from shift register 100 will be as shown in horizontal row 1 of FIG. 2; and specifically will consist of bits "1100101," with the bit at the right occurring first in time and the others following in sequential order.

The vertical column (labeled "Initial Setting") of 3-bit codes represents the seven possible combinations of such 3-bit codes, excluding "000." Each of these 3-bit codes will produce a different 7-bit character and is used as the initial setting of the various code generators to produce the different address codes. The column of 3-bit codes is arranged such that succeeding codes represent the condition of the code generator after the generation of a single bit. Thus, if the register 100 initially contains the bits "101," the said three stages for the shift register will contain the bits "010" after the first shift signal, and will contain the bits "001" after the second signal pulse, and will contain the bits "100" after the third shift pulse, and so on through seven different configurations. The eighth 3-bit code is the same as the first in the left-hand column of FIG. 2 and represents the completion of the cycle. Repetition of the first seven will occur beginning with the eighth 3-bit code. There are only seven different combinations possible with the three stage shift register since the code setting "000" is not allowable, or even possible, in this particular arrangement. There must always be at least one mark or "1" contained in the register in order for the system to generate a new code.

In the right-hand vertical column of FIG. 2 are shown eight groups of 7-bit code characters. Each of these 7-bit words, or characters, represent the first seven bits generated by the particular setting of the three stages of the shift register 100 of FIG. 1; said particular setting being shown in the corresponding row of the left-hand column of FIG. 2. For example, as stated above, if the three stages of the register 100 contain bits "101," then the first seven bits supplied from stage 103 to modulating means 111 are as shown in the first row of the right-hand column of FIG. 2, and consist of bits "1100101," with the right-hand bit occurring first in time. If the generation of the bits continues, the said seven bits will be repeated over and over again.

Similarly, if the condition of the three stages of the register 100 contain bits "010," then the first seven bits generated therefrom are "1110010," as shown in the second row of the right-hand column of FIG. 2. In a like manner, the remaining five 7-bit codes are generated as a result of various bit settings of the three stages of shift register 100, as indicated in the left-hand column of FIG. 2.

It will be observed that each of the 7-bit codes in the right-hand column of FIG. 2 follow the same sequence, except that each begins at a different point in the cycle of seven bits. More specifically, each of the 7-bit codes lag the 7-bit code immediately above it by one bit. Thus, the code in row 2 would be the same as the 7-bit code of row 1, if the "1" at the left-hand end thereof were placed at the right-hand end thereof.

Figure 3:
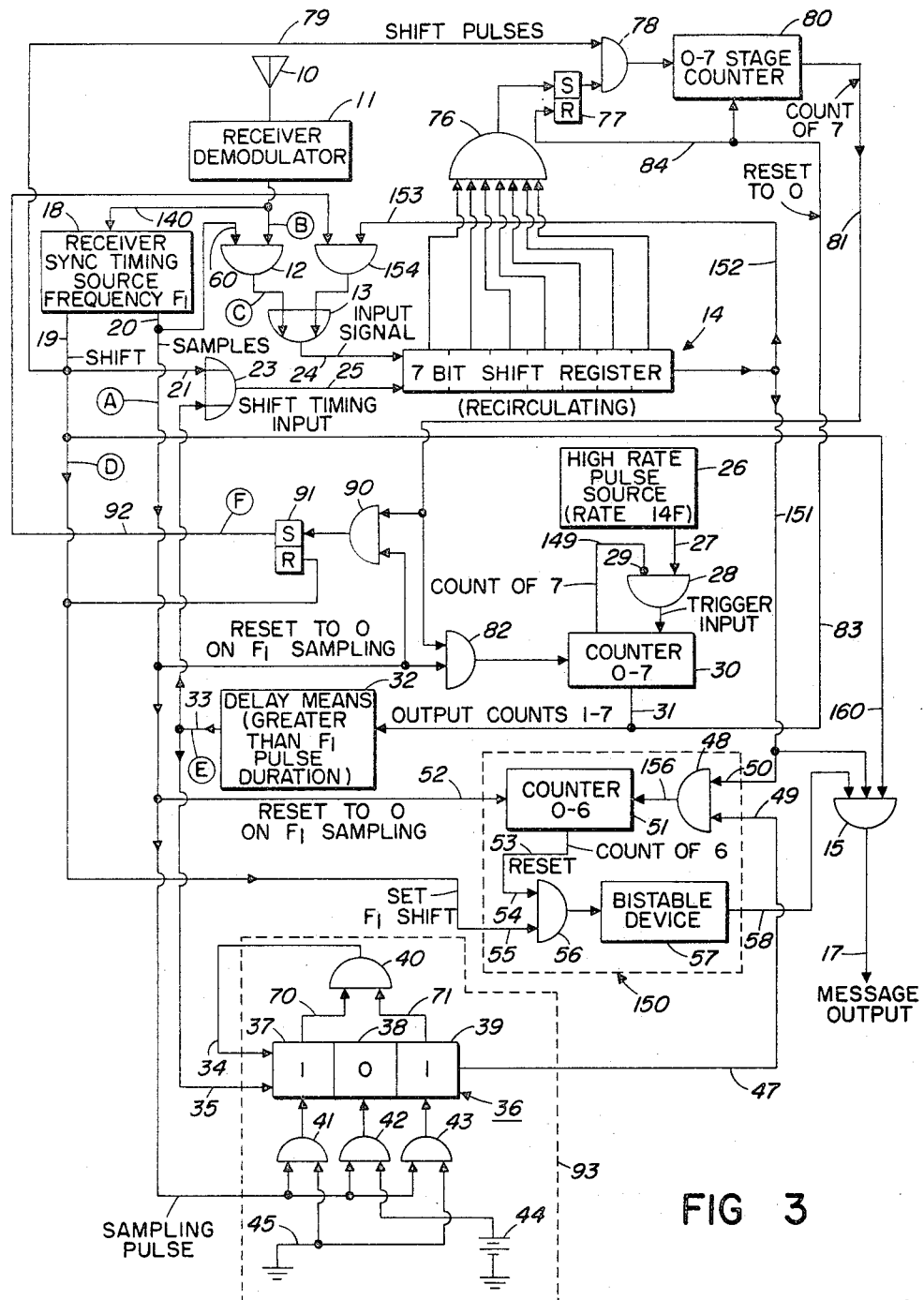
FIG. 3 is a block diagram showing a typical receiving network for sensing and evaluating a serially transmitted address received therein.

Referring now to FIG. 3, there is shown a block diagram of the receiver portion of the station. Such receiver portion is constructed to receive and identify the address (redundant) code generated by some transmitter in the system. It is to be understood that the structure of FIG. 3 does not show any structure for decoding intelligence-bearing information; FIG. 3 shows only that structure necessary to receive and identify address codes.

Figure 4:
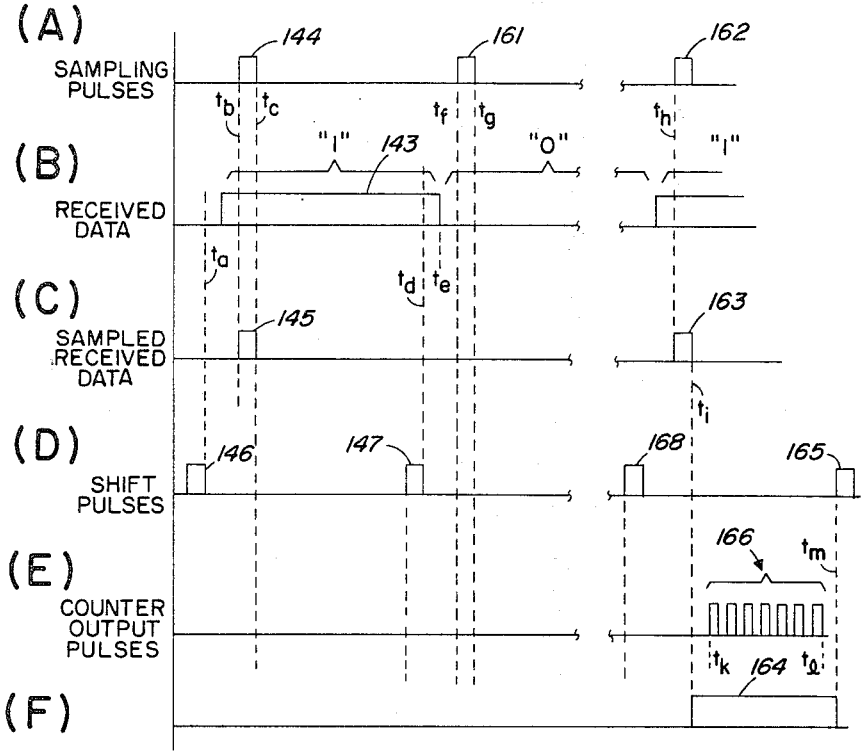
FIG. 4 is a set of waveforms showing the time relationship among received data sampling pulses and circulating pulses for facilitating understanding of the block diagram of FIG. 3.

The redundant code (address recognition code plus address code) from the transmitter, followed by data, is received and intercepted by antenna 10, and then demodulated in receiver demodulator 11 to remove the carrier and leave only the pulses representing marks and spaces. A receiver synchronizing timing source 18, which may be responsive to the received signal through lead 140, functions to generate a synchronizing signal of frequency $f_1$, which is the bit rate of the generated redundant codes. The synchronizing timing source 18 is further constructed to produce two output pulse trains which are phased apart in accordance with the curves A and D of FIG. 4. The pulse train of FIG. 4D represents the shift pulses employed to shift the shift registers 14 and 36 of FIG. 3, and the pulse train of FIG. 4A represents sampling pulses employed to gate information into the shift register 14, to reset counters 30 and 51, and to reset shift register 36, as will be discussed in detail later. The waveforms of FIGS. 4E and 4F represent the signals employed to compare the information received and stored in shift register 14 with the redundant code which is generated locally in generator 93, which contains shift register 36.

As discussed briefly hereinbefore, the general concept of the receiver is as follows. The received data is stored in the 7-bit shift register 14 in a serial manner and, of course, will change as each new bit is received from the transmitter. When the address recognition code is fully entered into the shift register 14, detection thereof will be made by AND gate 76. Following such detection, which will occur in all receivers, each receiver will generate its own local address code which will then be compared with the received address code to be entered into the shift register immediately following the address recognition code.

The flip-flop 77, the AND gate 78, and counter 80 function to respond to an output from AND gate 76 to open AND gate 82 and thereby reset counter 30. Resetting of counter 30 operates to initiate the comparison function of the receiver; that is, the comparison of the received address code stored in the shift register 14 with the local address code generated by generator 93.

Both the generation of the local address code and the recirculation of the information in shift register 14 is controlled by the output of counter 30, which counts from "0" to "7." Means, including a constantly producing high rate pulse source 26 and AND gate 28, which has a count-of-7 feedback input 149 from counter 30, functions to supply a single group of 7 pulses to counter 30 after the reception of an address recognition code. The output of the counter 30 is supplied to shift register 14 through delay means 32 and OR gate 23 and to the input of the local code generator 93 through delay means 32. The said delay means 32 functions to permit complete entry of a newly received bit into shift register 14 before recirculation of the information in register 14 begins. AND gate 48 and bit error counter 51 function as a comparison circuit to determine if sufficient coincidence exists between the locally generated address code and the code stored in the 7-bit register 14 to reasonably insure that the proper address has been obtained.

When sufficient coincidence exists between the bits stored in shift register 14 and the output of generator 93, counter 51 will count to a sufficiently high value to open AND gate 56 so that upon the occurrence of the next shift pulse the single input bistable device 57 will be set. As the result of the set condition of bistable device 57, output AND gate 15 is opened to permit passage of subsequently received information data through lead 17 to other portions of the receiver, not shown in FIG. 3.

The operation of the circuit of FIG. 3 will now be discussed in detail. A bit pulse, such as pulse 143 of FIG. 4B, is supplied from demodulator 11 of FIG. 3 to an input of AND gate 12. Such pulse begins at time $t_a$ and terminates at time $t_e$, which constitutes a bit length. At time $t_b$ a sampling pulse 144, shown in FIG. 4A, is generated by timing source 18 and supplied to the other input 60 of AND gate 12, causing a sampled portion 145 of FIG. 4C from input bit 143 of FIG. 4B to be supplied to input 24 of shift register 14 through OR gate 13.

It should be noted that just prior to the reception of the bit 143, a shift pulse 146, shown in FIG. 4D, was supplied from timing source 18 through OR gate 23 to shift register 14 to cause the contents of each of the seven stages therein to be advanced one stage, thus leaving the first stage open for the reception of the sampled bit 145 of FIG. 4C.

Until the receiver has been addressed, the data bits shifted out of the last stage of shift register 14 are not utilized in any manner since both AND gates 154 and 15 are closed, i.e., are not yet conductive.

Assume, however, that an address recognition code "1100101" is entered into the seven stages of shift register 14. Assume, further, that the entering of the address recognition code into shift registed 14 is completed with the sampling 145 of FIG. 4C which occurs at time $t_b$. The AND gate 76 will now have an output signal which will set flip-flop 77, which will in turn prepare AND gate 78 to conduct shift pulses to counter 80 when they are supplied via lead 79.

Such shift pulses will pass through gate 78 and cause counter 80 to count to 7. At the count of 7, a pulse will be supplied from counter 80 through lead 81 to AND gate 82, to prepare said AND gate for opening. In FIG. 4D assume that shift pulse 168 is the seventh shift pulse to be supplied to counter 80 to cause opening of AND gate 82.

The following sampling pulse 162 of FIG. 4A will then pass through AND gate 82 and reset counter 30 to "0." The pulses from pulse source 26 will pass through gate 28 and cause counter 30 to count to seven and to generate seven output pulses (pulses 166 in FIG. 4E) on output lead 31 thereof. At the count of seven AND gate 28 will become inhibited by virtue of the feedback lead 149 from counter 30 to inhibit terminal 29 of AND gate 28. AND gate 28 will now be closed, i.e., nonconductive, until counter 30 is again reset to "0" by the reception of another address recognition code in the manner described above.

It should be noted that the output of high pulse rate source 26 has a frequency sufficiently great to permit the seven comparing pulses to occur between the trailing edge of a sampling pulse, such as pulse 162 of FIG. 4A, and the leading edge of the next shift pulse, such as pulse 165 of FIG. 4D.

As indicated above, the seven pulses generated by counter 30 and supplied from delay means 32 perform two functions. Firstly, the seven pulses operate to recirculate the seven data bits stored in shift register 14 through two paths. One of these paths is from the output of the shift register 14 through lead 151 to input 50 of AND gate 48. The other path is through lead 152 to input 153 of AND gate 154. The latter path is the recirculating path and simply restores into the shift register the information which has been shifted out of the end stage thereof.

The AND gate 154 is caused to become open to permit recirculation during the time interval $t_1-t_m$ (FIG. 4F). The opening time $t_1$ is established by the simultaneous occurrence of count 7 of counter 80 and the lagging edge of an F1 sampling pulse. AND gate 90 is responsive to said two conditions to set flip-flop 91. The setting of flip-flop 91 prepares AND gate 154 for opening through lead 92. At time $t_m$ the shift pulse 165 functions to reset flip-flop 91, thus closing AND gate 154.

The other function of counts 1–7 supplied from delay means 32 is to energize shift register 36 to generate a redundant code therefrom. The seven counts from delay means 32 are supplied to shift register 36 via lead 35 and perform a shifting function. As described in connection with FIG. 1, the shift register 36 in cooperation with feedback means including leads 70 and 71, exclusive OR gate 40, and feedback lead 34 function to generate the redundant code on output lead 47. Such redundant code is supplied to input lead 49 of AND gate 48.

Thus, the information stored in the shift register 14 and the redundant code generated by shift register 36 are supplied simultaneously to AND gate 48. If coincidence occurs between enough of the pairs of bits as they are presented to AND gate 48, an output signal appears on output lead 156 of AND gate 48. Such output pulse is supplied to bit error counter 51, the output lead 53 of which is connected to input lead 54 of AND gate 56. When sufficient coincidence exists between the information in register 14 and that generated by generator 93, the coincidence counter 51 will count to its maximum count of 6, indicating such sufficient coincidence and insuring, within desired tolerance, that the address stored in the shift register 14 and that generated by the generator 93 are the same. The maximum number of coincidences in the particular embodiment of FIG. 3 may be seven, since seven bits are being compared. However, assume that a tolerance of one error is permitted, within which tolerance the address can be assumed to be correct. It should be noted that the actual maximum capacity of the counter 51 is six, so that it will register a count of six whether the count is actually six or seven.

When counter 51 does contain a count of six, there will appear on the count-of-six output lead 53 a signal which is supplied to input lead 54 of gate 56. Then, when the next subsequent shift pulse occurs and is supplied to input lead 55 of AND gate 56, the single input bistable device 57 will be changed from its reset state to its set state. The output gate 57 is responsive to the set state of bistable device 57 to pass data. It is to be noted that two conditions are necessary to pass data to output terminal 17. Firstly, the bistable device 57 must be in its set condition and, secondly, a shift pulse must be present on input lead 160 of AND gate 15. Thus, the comparison circuit 150 is employed both to open output gate 15 and to close said output gate. More specifically, if output gate 15 is initially closed, the reception of the proper address signal will result in the bistable device 57 being set so that output gate 15 will pass information supplied to its input onto output terminal 160. When the next address code (at the end of the message) is delivered, coincidence counter 51 will again count to its full count of 6 and, upon reception of the following shift pulse from timing source 18, the bistable device 57 will assume its reset state, thus closing output gate 15 and preventing passage of more data therethrough.

It is to be noted that in the absence of sufficient coincidence between the information stored in shift register 14 and the redundant code generated by generator 93, the coincidence counter 51 will not reach a count of 6 and the bistable device, consequently, will not be energized. The coincidence counter 51 is reset to zero once during each bit interval by a sampling pulse (of FIG. 4A) supplied thereto through lead 52 from timing source 18.

Figure 6:
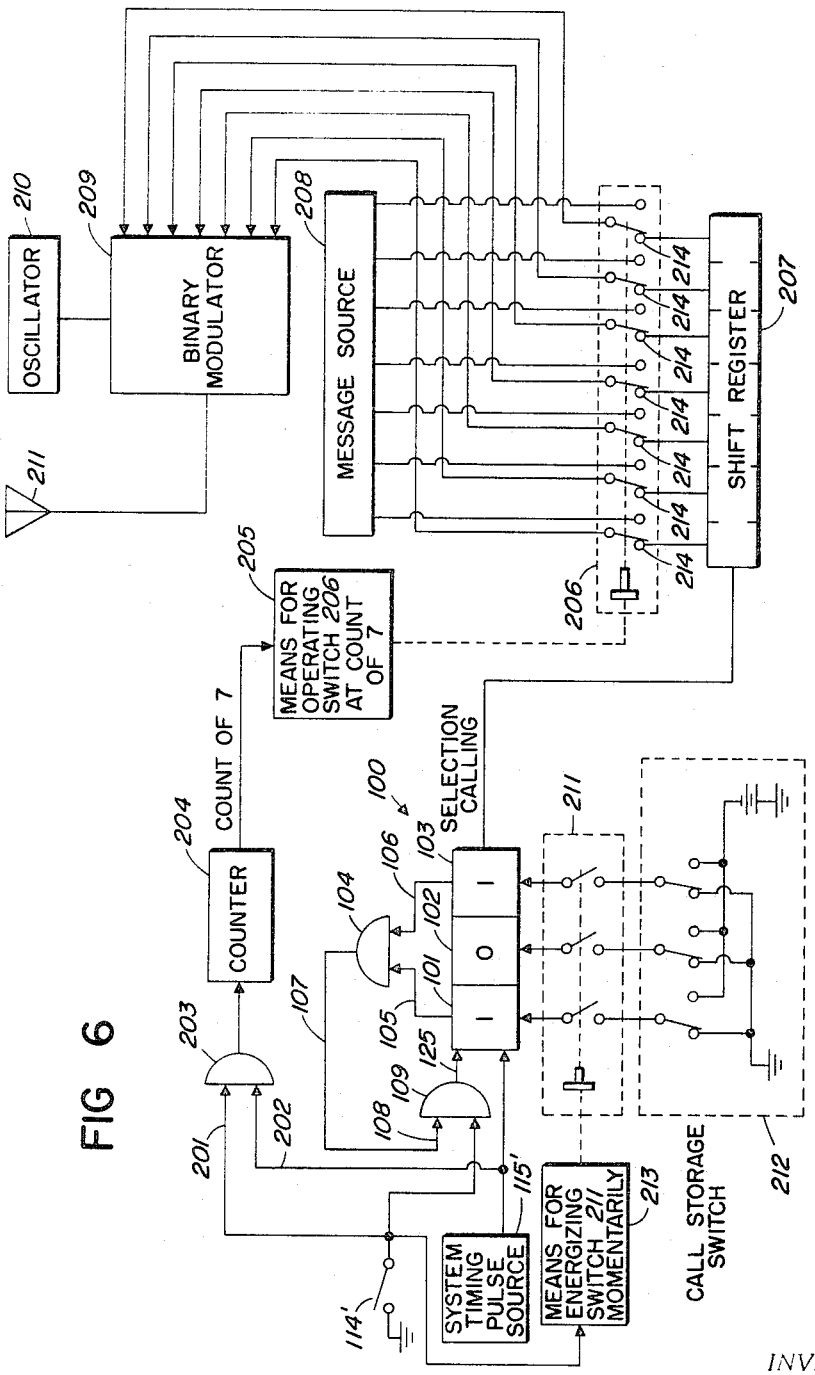
FIG. 6 is a block diagram of means for transmitting codes in parallel.

As discussed hereinbefore, the address codes can be transmitted in parallel form as well as serial form. In FIG. 6 there is shown a modification of the transmitter adapted to transmit the signal in parallel form. When transmitting in parallel form, it is not necessary that an address recognition code precede the address code since there is no danger of the bits of one code overlapping and becoming a part of the address code. In FIG. 6 the address code is generated by closing start switch 114′ which, in turn, energizes control circuit 213 to momentarily close switch 211. The stages of shift register 100 are then set in accordance with call storage switch 212 and the generation of the address code is initiated by supplying timing pulses from source 115′ to shift register 100. The generation of such address code is in series form and is supplied to shift register 207 in series form. When the address code has been fully entered into shift register 207, the control circuit 205 is energized (by counting means 204) to momentarily close the movable arms of switch 206 onto contacts 214 and thus transmit the address code in parallel form through said movable arms. After passage of one bit time interval the movable arms are returned to their normal position; which normal position is to make with the contacts connected to the message source 208.

The counter 204 functions to respond to input pulses from pulse source 115, after starting switch 114′ has been closed, to count the number of pulses supplied to shift register 100. At the count of 7 there will have been generated and passed into shift register 207, seven bits, which bits constitute the address code. Such address code is then ready to be transmitted.

Figure 7:
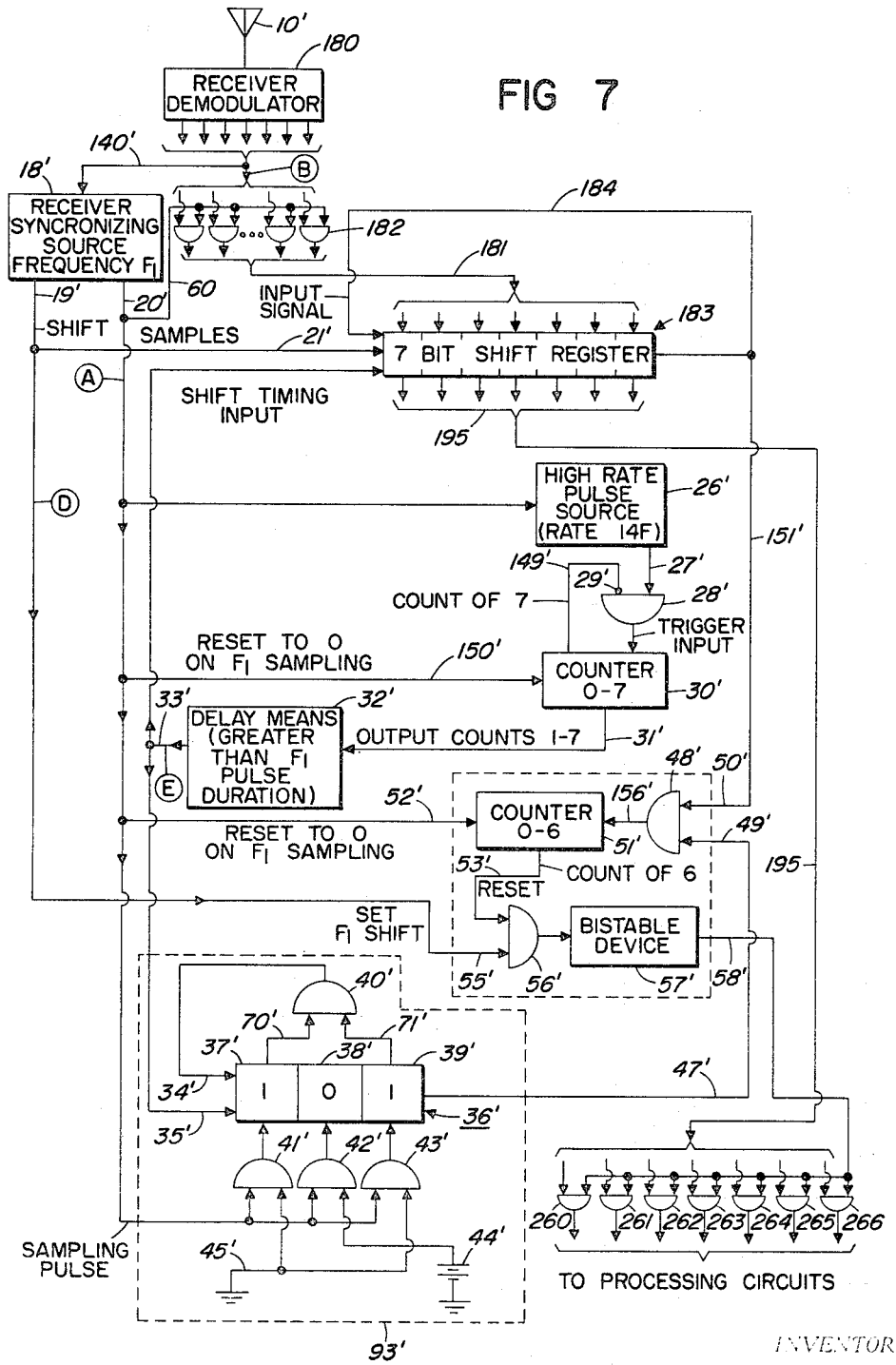
FIG. 7 is a block diagram of means for sensing and evaluating address codes transmitted in parallel form.

Referring now to FIG. 7, there is shown a form of the receiver adapted to receive codes transmitted in parallel form. The structure of FIG. 7 is similar to that of FIG. 3 in many respects, and components of FIG. 7 which correspond to components of FIG. 3 have the same reference characters, although primed.

In FIG. 7 the code is received in parallel form by demodulator 180 and is then supplied through AND gates 182 to the seven stages of shift register 183 in parallel form. As in the case of the structure of FIG. 3, the received input is sampled and by sampling pulses, as shown in FIG. 8A. For example, sample pulse 190 samples the received data shown in FIG. 8B. It is to be noted that while only one bit is shown in FIG. 8B, actually all seven bits of the received signal are sampled at the same time since all are being received in parallel.

The shift register 183 is of the type whereby information can either be shifted from stage to stage in the conventional manner, or in which information can be transferred out therefrom in parallel. The shift timing signals shown in FIG. 8D function to shift the information out of the shift register in such parallel form via leads 195 and to the output gates 260 through 266. On the other hand, the counter output pulses 194 of FIG. 8E function to shift the information in the shift register 183 from stage to stage and means are provided to recirculate the information back into the input stage as it is shifted out of the output stage.

Each sampling pulse, which samples the incoming code and enters it into shift register 183, also resets counter 30' to "0" and initiates a count of seven therein with the aid of high rate pulse source 26' and inhibit AND gate 28', in the manner described re. FIG. 3. The output of counter 30' is supplied through delay means 32' back to the input of shift register 183 and also to local code generator 93'. The code stored in shift register 183 is recirculated by the seven output pulses supplied thereto through lead 184. The code stored in register 183 is also supplied in series to the input lead 50' of AND gate 48'.

Simultaneously, the local code generator 93' generates the local address code which is supplied to input lead 49' of AND gate 48' through lead 47'. Counter 51', AND gate 56', bistable device 57', and output AND gate 15' then function, in the manner described re. FIG. 3, to open output AND gates 260 through 266, when sufficient coincidence exists between the received code and the locally generated address code.

Upon receipt of another address code at the end of the message, the process is repeated except that the bistable device 57 will now be caused to assume its other state and thereby close output gates 260 through 266.

In FIG. 9 there is shown a different and somewhat simplified structure for receiving codes transmitted in parallel form. Such codes are intercepted by antenna 215 and supplied to a receiver demodulator 216. The 7-bit code is then supplied in parallel via the seven output leads 220 to address-responsive AND gate 218 and also to receiver synchronizing source 217. The AND gate 218 is constructed to respond only to the address code and will prepare the AND gate 219 for conductivity when such an address code is present.

The receiver synchronizing source 217 responds to the received signal to produce the synchronizing (sampling) pulses shown in FIG. 10. One of said synchronizing pulse trains is designated as sampling pulse A and the other is designated as sampling pulse B. Sample pulse B follows sample A in time for any given code frame interval and passes a pulse through gate 219 when an address code (logic 1) is being received. The output of gate 219 causes single-input bistable device 224 to change states. Assuming bistable device 224 has been in its set state, such an output pulse will cause it to assume its reset state and prepare AND gate 221 for conductivity. Thus, when sample pulse A occurs at the next bit interval, the output from AND gate 221 will open AND gates 225 through 231 and all subsequently reecived codes will pass into the receiver via leads 237, for processing.

When the next address code, marking the end of transmission, is received, the bistable device 220 will be caused to assume its set condition, thus closing gate 221 and preventing the reception of further information by that particular receiver.

It is to be understood that the forms of the invention shown and described herein are but preferred embodiments thereof and that various changes may be made in circuit arrangement and in specific logic employed without departing from the scope or the spirit of the invention.

I claim:
1. A selective calling system comprising:
   first generating means for generating an address recognition code followed by a first redundant address code and receiving means for receiving said redundant address code,
   said first generating means comprising:
      first shift register means having N stages therein, and having input terminal means;
      first exclusive OR gate means responsive to the states of preselected stages of said first shift register to produce output signals;
      first means for supplying the output signals of said exclusive OR gate means to the input terminal means of said first shift register means;
      shifting means for shifting the information in said first shift register means along consecutive stages thereof;
      and first means for presetting the stages of said first shift register means to preselected states;
   said receiving means comprising:
      second shift register means constructed to receive and store the address recognition code and the redundant address code;
      second generating means for generating a unique redundant code in serial form and having the same pattern as the received redundant address code;
      recognition means responsive to said address recognition code when it is stored in said second shift register means to produce a recognition signal;
      third signal generating means responsive to said recognition signal to generate a burst of pulses after the reception of storage of the received redundant address code but before the reception of another bit;
      said second shift register means and said second generating means responsive to said burst of pulses to produce at their outputs the redundant address codes stored and generated therein, respectively;
      and comparing means for comparing coincidence of the individual data bits of the output signals produced by said second shift register means and said second generating means.
2. A selective calling system comprising:
   first generating means for generating an address recognition code followed by a redundant address code, and receiving means for receiving said redundant address code;
   said receiving means comprising:
      second generating means for locally generating said redundant address code and comprising:
         first shift register means;
         first exclusive OR gate means;
         means for supplying the output of said first exclusive OR gate means to the input terminal means of said first shift register means;
         and shifting means for shifting the information in said first shift register means therealong;
      second shift register means having M stages and constructed to receive and store the address recognition code and the redundant address code generated by said first generating means;
      recognition means responsive to said address recognition code when it is stored in said second shift register means to produce a recognition signal;
      third generating means responsive to said recognition signal to generate a series of impulses M between the occurrence of adjacent data bits;
      said first shift register means and said second shift register means responsive to said series of M pulses to produce at the output terminals thereof, respectively, the locally generated redundant address code and the redundant address code and the received re- dundant address code stored in said first shift register means;

and means for comparing the individual bits of said first and second redundant codes to determine the degree of coincidence therebetween.

3. A selective calling system in accordance with claim 2 comprising:

first shifting means for shifting the information stored in said second shift register means immediately before the reception of a data bit from said first generating means;

and means for resetting the stages of said first shift register means to predetermined states immediately preceding the generation of each series of M pulses.

4. A selective calling system in accordance with claim 3 comprising:

switching means responsive to a predetermined level of coincidence between said received and locally generated redundant address codes to prepare said receiver means for receiving message data following said redundant code.

5. Receiving means for receiving and recognizing a specific code comprising:

first signal generating means for locally generating at said receiver means said specific code in serial form;

first shift register means constructed to receive and store the received code;

timing means;

second signal generating means responsive to said timing means to generate a burst of pulses after reception and storage of said received specific code;

said first shift register means and said first signal generating means responsive to said burst of pulses to produce at their outputs the specific codes stored and generated therein, respectively;

and comparing means for comparing the coincidence of the individual bits of the output signals produced by said first signal generating means;

said first signal generating means comprising:

second shift register means having input terminal means and N stages capable of producing a redundant code of M bits;

exclusive OR gate means responsive to selective stages of said second shift register means to supply input data to said input terminal means thereof;

and means responsive to said timing means for setting the stages of said second shift register means to predetermined states immediately preceding the generation of each of said bursts of pulses;

said second shift register means responsive to said burst of pulses to generate said specific code;

shifting means for shifting the information stored in said first shift register means immediately before the reception of a data bit from said first signal generating means;

and switching means responsive to a predetermined level of coincidence between the output of said first shift register means and said second shift register means to prepare said receiver means for receiving message data following said specific code.

References Cited
UNITED STATES PATENTS

| | | | |
|---|---|---|---|
| 3,001,176 | 9/1961 | Ingham | 340—147 |
| 3,064,080 | 11/1962 | Rea et al. | 178—23 |
| 3,069,657 | 12/1962 | Green et al. | 340—171 |
| 3,114,130 | 12/1963 | Abramson | 340—146.1 |
| 3,141,928 | 7/1964 | Davey et al. | 178—50 |

MALCOLM A. MORRISON, *Primary Examiner.*

C. E. ATKINSON, *Assistant Examiner.*

UNITED STATES PATENT OFFICE
CERTIFICATE OF CORRECTION

Patent No. 3,384,873

May 21, 1968

Roshan Lal Sharma

It is certified that error appears in the above identified patent and that said Letters Patent are hereby corrected as shown below:

Column 10, line 1, "57" should read -- 15 --.

Signed and sealed this 30th day of December 1969.

(SEAL)
Attest:

Edward M. Fletcher, Jr.
Attesting Officer

WILLIAM E. SCHUYLER, JR.
Commissioner of Patents